No. 645,158. Patented Mar. 13, 1900.
G. N. WINDLE.
VEHICLE WHEEL BRAKE.
(Application filed Dec. 8, 1899.)
(No Model.) 2 Sheets—Sheet 2.
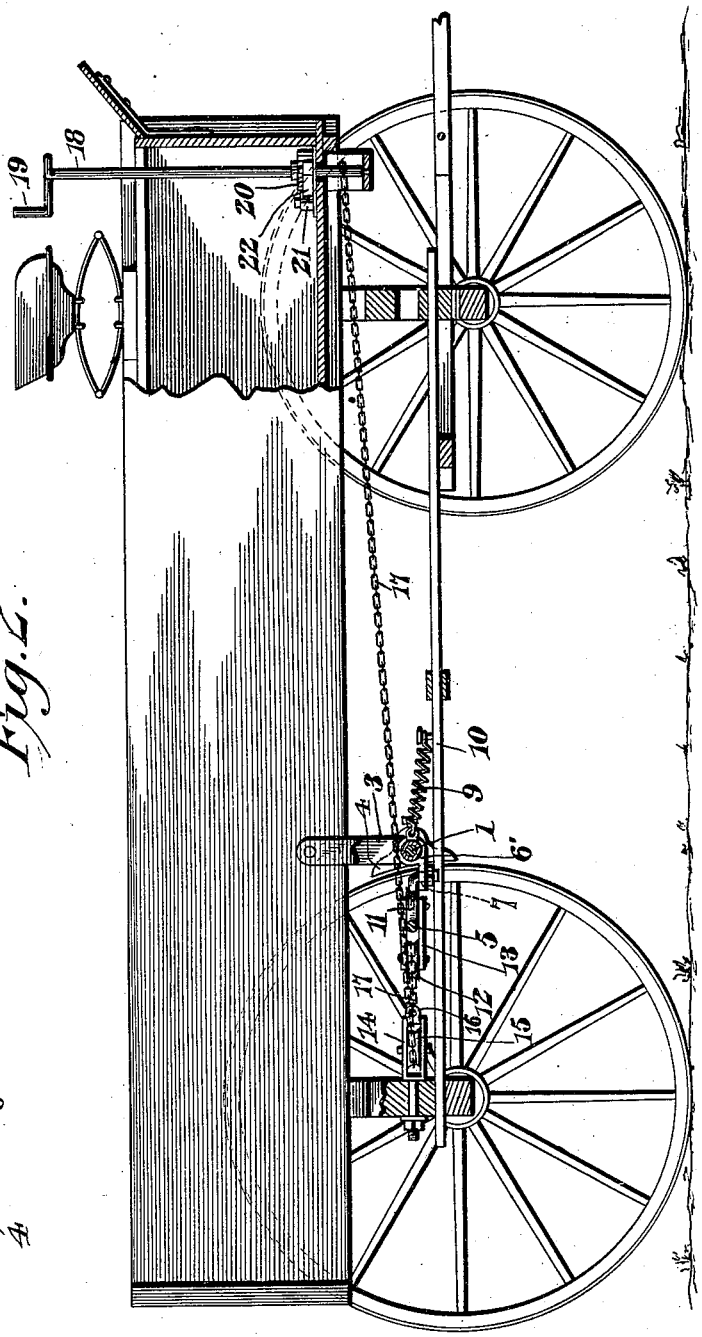
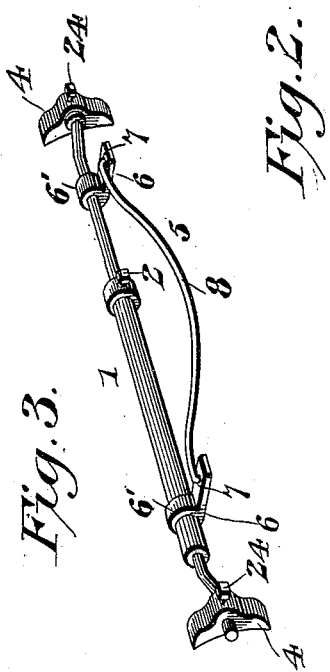
G. N. Windle, Inventor

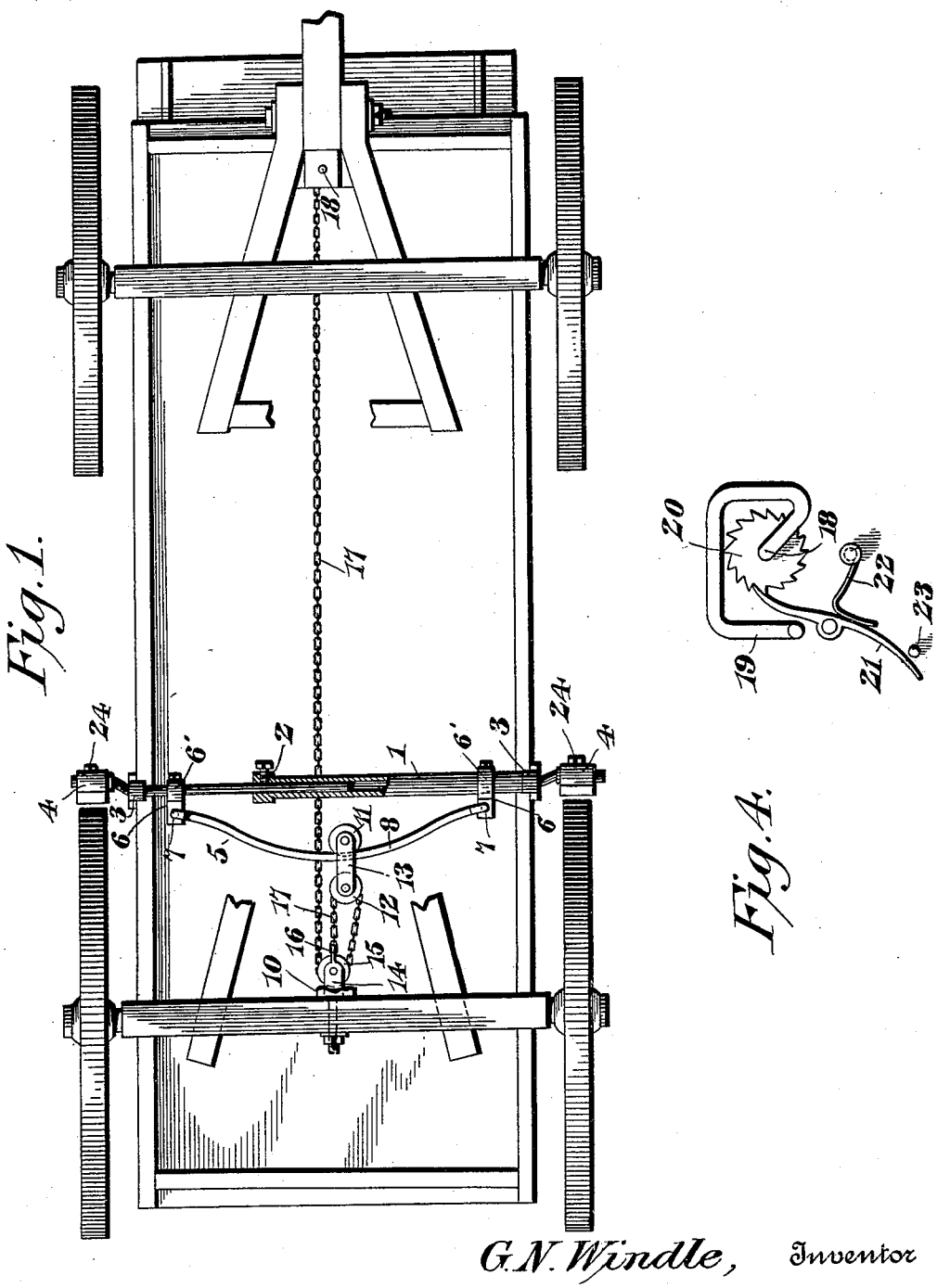

UNITED STATES PATENT OFFICE.

GEORGE NESTOR WINDLE, OF FRAZIER'S BOTTOM, WEST VIRGINIA, ASSIGNOR OF ONE-HALF TO JAMES HOWARD DONNALLY AND JAMES R. EWERS, OF SAME PLACE.

VEHICLE-WHEEL BRAKE.

SPECIFICATION forming part of Letters Patent No. 645,158, dated March 13, 1900.

Application filed December 8, 1899. Serial No. 739,688. (No model.)

*To all whom it may concern:*

Be it known that I, GEORGE NESTOR WINDLE, a citizen of the United States, residing at Frazier's Bottom, in the county of Putnam and State of West Virginia, have invented a new and useful Vehicle-Wheel Brake, of which the following is a specification.

In vehicle-wheel brakes as ordinarily applied to carriages, wagons, &c., some difficulty has been experienced in securing a proper and uniform action or pressure of the brake-shoes on the rims of the wheels, the shoe at one side often bearing with greater pressure than that upon the other or being out of contact entirely with its respective wheel and throwing all the work on a single shoe, which of course results in the too-rapid wearing away of said shoe.

It is one object of the present invention to provide a simple economical brake and operative connections therefor whereby the brake-beam is to a considerable extent self-adjusting, so as to insure a uniform application of the shoes to their respective wheels.

It is also an object of the invention to provide, in connection with such brake-beam, an equalizing-traveler in connection with a system of multiplying-pulleys around which a flexible brake connection runs, thereby enabling any desired power to be transmitted by the operator to the brake-beam.

A further object of the invention is to provide a brake-beam of such construction as to adapt the brake mechanism as a whole to be applied to vehicles of different treads.

Other objects and advantages of the invention will appear in the course of the ensuing description.

The invention consists in a vehicle-wheel brake embodying certain novel features and details of construction and arrangement of parts, as hereinafter fully described, illustrated in the drawings, and incorporated in the claims.

In the accompanying drawings, Figure 1 is a bottom plan view of a vehicle, showing the brake mechanism applied thereto. Fig. 2 is a vertical longitudinal section through the same. Fig. 3 is a detail perspective view of the brake-beam with its traveler-rod. Fig. 4 is a detail plan view showing the ratchet-wheel on the brake-staff and the spring-pressed detent engaging therewith.

Similar numerals of reference designate corresponding parts in all the figures of the drawings.

The brake contemplated in this invention is especially adapted to spring buggies, carriages, and wagons having a non-removable or stationary body.

In carrying out the present invention I employ a hollow brake-beam 1, which is composed of a plurality of tubular sections telescopically arranged so as to slide one within the other and to be held when adjusted by means of a fastening device 2, which may be in the nature of a binding-screw or a clamp-collar, according to preference. By constructing the brake-beam in this manner it is rendered extensible, so that it may be increased or diminished in length for correspondingly varying the distance between the brake-shoes 4, which are applied to the end portions thereof. The beam 1 is swung in pivotal links 3.

Extending alongside the brake-beam 1 is a traveler-rod 5, which is connected at its extremities to the brake-beam. In order to offset the traveler-rod at the required distance from the brake-beam, connecting-irons 6 are employed, each of which at one end embraces the brake-beam, as shown at 6', being clamped tightly thereon, the opposite end of the connection having an opening 7 to receive one of the hooked or recurved extremities of the traveler-rod. By loosening the connections 6 where they embrace the brake-beam they may be slid longitudinally upon the brake-beam sections when the latter are adjusted for extending or contracting the brake-beam in length. The traveler-rod is preferably constructed of spring metal, so that it will yield or rather enable one or the other of the brake-shoes to yield and bear with a yielding pressure against its respective wheel in order to compensate for inequalities in the wheel or obstructions which may adhere thereto. The traveler-rod is also bowed or curved at its central portion, as shown at 8, the distance between the brake-beam and the traveler-rod being greatest at the center of both of said parts.

A retracting-spring 9 is connected at one end to the center of the brake-beam 1 and at its opposite end to the reach-bar 10 of the running-gear or to any other convenient fixed point, said spring having a double function in that it acts to throw the brake-shoes off the wheels and also keep taut the flexible connection by means of which the brake-beam is operated.

Working upon the traveler-rod is a traveler comprising a traveler-wheel 11, grooved to traverse the traveler-rod, a pulley-wheel 12, and a connecting-frame comprising parallel plates or links 13, which receive the spindles of said wheel and pulley and serve to couple them together. Connected to the rear axle or other convenient part of the running-gear is a bracket or block 14, in which is journaled a groove-pulley 15. Connected to the bracket is an eye 16, and attached to said eye is a flexible connection 17, the said connection being secured at one end to the eye 16, passing thence forward around the traveler-pulley, thence rearward around the pulley 15, and thence forward to a point adjacent to the front axle, where it connects fixedly with and is adapted to be wound upon a brake-staff 18, suitably mounted upon a vehicle and provided with an operating-handle 19 within convenient reach of the operator. The staff is also provided with a ratchet-wheel 20, in connection with which operates an intermediately-fulcrumed foot lever or detent 21, which is held in engagement with the ratchet-wheel by means of an actuating-spring 22. A stop-pin 23 is placed at a suitable point to coöperate with and limit the movement of the detent as the latter is thrown out of engagement with the ratchet-wheel on the brake-staff.

In view of the foregoing description it will be seen that by turning the brake-staff and winding the flexible brake connection thereon the traveler is drawn toward the rear axle, and on account of the bow or curvature of the traveler-rod the traveler will always work toward the center of the traveler-rod, so as to equalize the pressure on both brake-shoes, or, more accurately speaking, force the brake-shoes with equal or uniform pressure against their respective wheels. At the same time the brake-shoes are yieldingly held against their respective wheels by means of the spring traveler-rod, thus avoiding the liability of fracturing the brake-beam or other parts of the apparatus in case of an object becoming wedged between either one of the brake-shoes and its wheel. The brake-shoes may be adjusted in or out on the brake-beam by means of binding-screws 24, passing therethrough and impinging or biting against the brake-beam. Where the tread of the vehicle is unusually wide or narrow, the brake-beam may be extended or contracted in length so as to properly position the shoes with respect to the wheel-rims upon which they operate. It is also within the scope of this invention to provide any number of multiplying-pulleys for use in connection with the traveler in order to attain any desired braking power from the brake-staff. The flexible connection which attaches to the brake-shaft and which works upon the pulleys may consist of a chain with short links or may be composed of a wire cable, as may be found most expedient in practice and as may be required by the nature or size of the vehicle upon which the brake mechanism is employed.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described the invention, what I claim as new, and desire to secure by Letters Patent, is—

1. In a vehicle-wheel brake, a movable brake-beam carrying brake-shoes and a yieldable traveler-rod fast with the beam, in combination with brake connections having a sliding and self-adjusting connection with said yieldable traveler-rod, substantially as specified.

2. In a vehicle-wheel brake, a movable brake-beam provided with a yieldable traveler-rod, in combination with a traveler, and a brake connection attached to said traveler, substantially as set forth.

3. In a vehicle-wheel brake, a movable brake-beam provided with a yieldable traveler-rod having an intermediate bowed portion, in combination with an equalizing-traveler to which the brake-operating devices are connected, substantially as set forth.

4. In a vehicle-wheel brake, a movable brake-beam provided with a bowed traveler-rod, in combination with a traveler adapted to be deflected by the bowed rod toward the central portion of the beam, and a brake connection attached to said traveler, substantially as set forth.

5. In a vehicle-wheel brake, a movable brake-beam provided with a spring traveler-rod, in combination with a traveler, and a brake connection attached to said traveler, substantially as set forth.

6. In a vehicle-wheel brake, a spring-retracted brake-beam provided with a traveler-rod, in combination with a traveler, and a brake connection attached to said traveler, substantially as set forth.

7. In a vehicle-wheel brake, a movable brake-beam, and a traveler-rod made fast with said beam within the end portions thereof, in combination with a traveler comprising a traveler-wheel, a pulley, and a connecting-frame, and a brake connection attached to said traveler, substantially as set forth.

8. In a vehicle-wheel brake, a movable brake-beam provided with a traveler-rod, in combination with a traveler, a flexible brake connection attached to said traveler, and a set of power-multiplying pulleys for said flexible connection, substantially as set forth.

9. In a vehicle-wheel brake, a longitudinally-extensible brake-beam comprising a plurality of telescopically-assembled sections, and means for relatively fixing said sections, in combination with oscillatory bearings in which the brake-beam is loosely mounted for swinging movement therewith and extensible adjustment therein, and brake connections having slidable engagement with said beam, substantially as set forth.

10. In a vehicle-wheel brake, a longitudinally-extensible brake-beam comprising a plurality of telescopically-assembled sections, means for relatively fixing said sections, and a traveler-rod connected with the beam in such manner as to admit of said beam being extended or contracted in length, substantially as specified.

11. In a brake, the combination of oscillatory bearings, a brake-beam, brake-operating devices having a self-adjusting and yieldable connection with the beam, and a repressing-spring for holding the beam in a non-applied position.

12. In a brake, the combination of oscillatory bearings, a brake-beam, loose brake-operating devices having a self-adjusting and yieldable connection with said beam, and a repressing-spring operatively associated with the beam and the loose brake-operating devices to take up the slack in the latter and hold the beam in a non-applied position.

13. In a brake, the combination of an extensible brake-beam, a traveler-rod clamped to individual sections of said beam, and brake-operating devices having self-adjusting connection with said traveler-rod.

14. In a brake, an extensible beam, a traveler-rod, and means for clamping the end portions of the traveler-rod to separate members of said beam, combined with brake-operating devices having self-adjusting connection to the traveler-rod.

In testimony that I claim the foregoing as my own I have hereto affixed my signature in the presence of two witnesses.

GEORGE NESTOR WINDLE.

Witnesses:
B. M. FRAZIER,
GEO. RONLEY.